(12) United States Patent
Wang

(10) Patent No.: US 8,979,023 B1
(45) Date of Patent: Mar. 17, 2015

(54) IMPACT PROTECTION APPARATUS

(71) Applicant: SZ DJI Technology Co., Ltd, Shenzhen, Guangdong (CN)

(72) Inventor: Mingyu Wang, Shenzhen (CN)

(73) Assignee: SZ DJI Technology Co., Ltd, Shenzhen (CN)

( * ) Notice: Subject to any disclaimer, the term of this patent is extended or adjusted under 35 U.S.C. 154(b) by 0 days.

(21) Appl. No.: 14/257,930

(22) Filed: Apr. 21, 2014

Related U.S. Application Data

(63) Continuation of application No. PCT/CN2014/072653, filed on Feb. 27, 2014.

(51) Int. Cl.
*B64C 25/56* (2006.01)
*B64C 25/32* (2006.01)

(52) U.S. Cl.
CPC ..................................... *B64C 25/32* (2013.01)
USPC ...................................... 244/100 A; 244/107

(58) Field of Classification Search
USPC ...................................... 244/100 A, 107, 139
See application file for complete search history.

(56) References Cited

U.S. PATENT DOCUMENTS

| | | | | |
|---|---|---|---|---|
| 5,409,187 A | * | 4/1995 | Dunham | 244/149 |
| 5,560,568 A | * | 10/1996 | Schmittle | 244/48 |
| 5,836,544 A | * | 11/1998 | Gentile | 244/17.17 |
| 5,992,794 A | | 11/1999 | Rotman et al. | |
| 6,289,820 B1 | * | 9/2001 | Anacker et al. | 102/530 |
| 6,471,160 B2 | * | 10/2002 | Grieser | 244/139 |
| 7,875,989 B2 | * | 1/2011 | Morris et al. | 290/40 B |
| 8,123,162 B2 | | 2/2012 | Sirkis | |
| 8,565,981 B2 | * | 10/2013 | Filias | 701/45 |
| 8,588,996 B2 | * | 11/2013 | Hill et al. | 701/3 |
| 2001/0048050 A1 | | 12/2001 | Grieser | |
| 2007/0145193 A1 | | 6/2007 | Hakki et al. | |
| 2010/0206983 A1 | | 8/2010 | Tho et al. | |
| 2011/0315806 A1 | | 12/2011 | Piasecki et al. | |
| 2013/0062465 A1 | | 3/2013 | Hill et al. | |

(Continued)

FOREIGN PATENT DOCUMENTS

| | | |
|---|---|---|
| CN | 101020505 A | 8/2007 |
| CN | 101495365 A | 7/2009 |

(Continued)

OTHER PUBLICATIONS

Bolukbasi, Akif. "Active Crash Protection Systems for UAVs", American Helicopter Society Annual Forum 63 Proceedings, Virginia Beach, VA, May 3, 2007.*

(Continued)

*Primary Examiner* — Brian M O'Hara
*Assistant Examiner* — Michael Kreiner
(74) *Attorney, Agent, or Firm* — Wilson Sonsini Goodrich & Rosati

(57) ABSTRACT

An impact protection apparatus is provided, comprising a gas container configured to hold a compressed gas and an inflatable member configured to be inflated by the gas and function as an airbag of a movable object, such as an aerial vehicle. A valve controls flow of gas from the container to the inflatable member in response to a signal from a valve controller. The valve and valve controller are powered by an independent power source than one or more other systems of the movable object. A safety mechanism may also be provided that, unless deactivated, prevents inflation of the inflatable member.

30 Claims, 8 Drawing Sheets

(56) References Cited

U.S. PATENT DOCUMENTS

2013/0233964 A1    9/2013    Woodworth et al.
2014/0032034 A1    1/2014    Raptopoulos et al.

FOREIGN PATENT DOCUMENTS

| | | |
|---|---|---|
| CN | 101835651 A | 9/2010 |
| CN | 102470921 A | 5/2012 |
| EP | 2112065 A2 | 10/2009 |
| JP | 01306397 A | 12/1989 |
| JP | 2009-208674 A | 9/2009 |
| TW | I242700 B | 11/2005 |
| WO | WO 93/17894 A1 | 9/1993 |

OTHER PUBLICATIONS

International search report and written opinion dated Dec. 2, 2014 for PCT/CN2014/072653.

International search report and written opinion dated Sep. 26, 2014 for PCT/CN2014/076419.

* cited by examiner

IMPACT PROTECTION APPARATUS

CROSS-REFERENCE

This application is a continuation application of International Application No. PCT/CN2014/072653, filed on Feb. 27, 2014, the content of which is hereby incorporated by reference in its entirety.

BACKGROUND

Aerial vehicles such as unmanned aerial vehicles can be used for performing conveyance, delivery, surveillance, reconnaissance, and exploration tasks for military and civilian applications. Such vehicles typically include a propulsion system for remote controlled and/or autonomous movement with the surrounding environment. For example, an aerial vehicle may be propelled through the air via a propulsion system, and may be capable of take-off and landing, flight, and hovering.

When an aerial vehicle malfunctions in mid-air it will fall. This can cause damage to the aerial vehicle, as well as any payloads or passengers.

SUMMARY OF THE INVENTION

A need exists for improved systems, methods, and devices for protecting movable objects such as aerial vehicles. The present invention provides systems, methods, and devices for airbags that may assist with protecting an aerial vehicle, such as an unmanned aerial vehicle, if the aerial vehicle were to fall during flight. In some embodiments, the systems, methods, and devices described herein provide an airbag that can be inflated using compressed gas. An aerial vehicle control mechanism can control a gas valve that controls whether gas will flow into the airbag, causing it to inflate. The control mechanism may be powered by a power supply that is independent of a power source powering other portions of the aerial vehicle.

An aspect of the invention is directed to an impact protection apparatus for an aerial vehicle, the apparatus comprising: an inflatable member configured to be coupled to the aerial vehicle and inflatable to reduce forces experienced by the aerial vehicle during an impact; a container coupled to the inflatable member, said container comprising compressed gas; and a control mechanism powered by a power source separate from that providing power to the aerial vehicle, wherein the control mechanism is configured to cause the compressed gas to flow from the container into the inflatable member in response to a signal indicative of malfunction of the aerial vehicle.

In some embodiments, the compressed gas is carbon dioxide. The volume of the container may be less than or equal to $0.001 \, m^3$. In some instances, pressure of the compressed gas when in the container is greater than or equal to $0.2 \times 10^6$ Pa.

The power source of the control mechanism may comprise a battery.

In some embodiments, the control mechanism comprises a valve configured to control flow of the compressed gas into the inflatable member. Optionally, the control mechanism comprises an accelerometer configured to detect an acceleration of the aerial vehicle that falls outside a predetermined range and is indicative of the malfunction. The accelerometer may be configured to detect an acceleration of the aerial vehicle indicative of the aerial vehicle being in free fall. The control mechanism may comprise a motion sensor configured to detect a loss of stability of the aerial vehicle that is indicative of the malfunction. The motion sensor may be an inertial measurement unit. The control mechanism may be configured to respond to a loss of power of the aerial vehicle that is indicative of the malfunction.

The signal that is indicative of malfunction of a member may be selected from the group consisting of one or more propulsion units of the aerial vehicle, a flight control system of the aerial vehicle, and a power source providing power to the aerial vehicle. The signal may be generated from the aerial vehicle. Alternatively, the signal may be generated from an external device in communication with the aerial vehicle.

An aerial vehicle may be provided in accordance with another aspect of the invention. The vehicle may comprise: a vehicle body; the impact protection apparatus of claim 1 coupled to the vehicle body; and one or more propulsion units coupled to the vehicle body and configured to propel the vehicle body.

The aerial vehicle may be an unmanned aerial vehicle. The unmanned aerial vehicle may be a rotorcraft.

The control mechanism of the aerial vehicle may comprise a valve configured to control flow of the compressed gas into the inflatable member. The control mechanism may comprise an accelerometer configured to detect an acceleration of the aerial vehicle that falls outside a predetermined range and is indicative of the malfunction. The control mechanism may be powered by a power source separate from that providing power to the one or more propulsion units of the aerial vehicle. The control mechanism can be powered by a power source separate from that providing power to a flight control system of the aerial vehicle.

Additional aspects of the invention may be directed to a method for protecting an aerial vehicle from an impact, the method comprising: providing an inflatable member coupled to the aerial vehicle; causing, in response to a signal indicative of malfunction of the aerial vehicle and by means of a control mechanism powered independently from the aerial vehicle, a compressed gas to flow into the inflatable member; and effecting inflation of the inflatable member by the flow of the compressed gas to reduce forces experienced by the aerial vehicle during the impact.

The compressed gas may be carbon dioxide.

In some embodiments, the control mechanism may comprise a valve configured to control flow of the compressed gas into the inflatable member. The method may include powering the control mechanism by a power source separate from that providing power to the one or more propulsion units of the aerial vehicle. In some implementations, the method includes powering the control mechanism by a power source separate from that providing power to a flight control system of the aerial vehicle. The control mechanism may comprise an accelerometer configured to detect an acceleration of the aerial vehicle that falls outside a predetermined range and is indicative of the malfunction. The method may further comprise detecting, with aid of the accelerometer, an acceleration of the aerial vehicle indicative of the aerial vehicle being in free fall. The method may also include detecting, using a motion sensor from an inertial measurement unit, a loss of stability of the aerial vehicle that is indicative of the malfunction. The method can include responding, with aid of the control mechanism, to a loss of power of the aerial vehicle that is indicative of the malfunction.

The aerial vehicle may be an unmanned aerial vehicle. The unmanned aerial vehicle can be a rotorcraft in accordance with some implementations.

Furthermore, aspects of the invention may be directed to an impact protection apparatus for an unmanned aerial vehicle. The apparatus may comprise: an inflatable member configured to be coupled to the unmanned aerial vehicle, wherein said inflatable member is inflatable to reduce forces experienced by the unmanned aerial vehicle during an impact; a container coupled to the inflatable member, said containing comprising compressed gas; a control mechanism is configured to cause the compressed gas to flow from the container into the inflatable member, in response to a signal indicative of malfunction of said unmanned aerial vehicle; and a safety mechanism that, unless deactivated, prevents inflation of the inflatable member.

In some instances, the compressed gas is carbon dioxide. The volume of the container can be less than or equal to 0.001 $m^3$. A pressure of the compressed gas when in the container may be greater than or equal to $0.2 \times 10^6$ Pa.

In some embodiments, the control mechanism comprises a valve configured to control flow of the compressed gas into the inflatable member. The signal may be indicative of malfunction of a member selected from the group consisting of one or more propulsion units of the aerial vehicle, a flight control system of the aerial vehicle, and a power source providing power to the aerial vehicle. The signal may be generated from the aerial vehicle. In other instances, the signal can be generated from an external device in communication with the aerial vehicle.

The safety mechanism may comprise a pin and deactivation of the safety mechanism may comprise removal of the pin. The pin may be configured to be removed by a user prior to operation of the unmanned aerial vehicle. The safety mechanism can be deactivated by a safety signal indicating that the unmanned aerial vehicle is in operation. The safety signal may be provided by a flight control system of the unmanned aerial vehicle.

An unmanned aerial vehicle may be provided in accordance with another aspect of the invention. The vehicle may comprise: a vehicle body; the impact protection apparatus of claim 33 coupled to the vehicle body; and one or more propulsion units coupled to the vehicle body and configured to propel the vehicle body.

Optionally, the unmanned aerial vehicle can be a rotorcraft.

Also, aspects of the invention may be directed to a method for protecting an unmanned aerial vehicle from an impact, the method comprising: providing an inflatable member coupled to the unmanned aerial vehicle; deactivating a safety mechanism preventing inflation of the inflatable member; causing, in response to a signal indicative of a malfunction of the aerial vehicle, a compressed gas to flow from said container into the inflatable member; and effecting inflation of the inflatable member by the flow of the compressed gas to reduce forces experienced by the unmanned aerial vehicle during the impact.

In some embodiments, the compressed gas is carbon dioxide. The compressed gas may be caused to flow using a valve. The method may include powering the valve by a power source separate from that providing power to the one or more propulsion units of the aerial vehicle. The method may also include powering the valve by a power source separate from that providing power to a flight control system of the aerial vehicle.

The unmanned aerial vehicle may be a rotorcraft.

In some implementations, the safety mechanism comprises a pin and deactivation of the safety mechanism comprises removal of the pin. The method can also include removing the pin by a user prior to operation of the unmanned aerial vehicle. The safety mechanism may be deactivated by a safety signal indicating that the unmanned aerial vehicle is in operation. The method can further comprise receiving the safety signal from a flight control system of the unmanned aerial vehicle.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space. Furthermore, any description herein of an airbag assembly may apply to and be used for any situation where an impact may occur.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The system, devices, and method of the present invention provide improved impact reduction mechanisms for movable objects, such as an aerial vehicle (e.g., an unmanned aerial vehicle (UAV)). In some embodiments, one or more airbags may be provided that may be inflatable to reduce forces on an aerial vehicle during impact. The airbags may be inflated using a compressed gas. Advantageously, inflating airbags using compressed gas is a more cost-effective method than using airbags that inflate using a chemical reaction. The airbag may reduce the forces of impact that may be experienced by the movable object, such as the aerial vehicle.

The aerial vehicle may have one or more compressed gas container mounted thereon. A gas valve may be provided that may control whether the compressed gas flows from the container into the airbag. The gas valve may be controlled using a valve controller. The valve and/or controller may be powered by a power source independent of the rest of the aerial vehicle. This may advantageously permit an airbag to deploy even if the rest of the aerial vehicle has lost power. This may be particularly useful, as an aircraft losing power may be a situation in which an impact is likely to occur.

The valve controller may include one or more sensors or receive data from one or more other sensors or controllers. The valve controller may use this data to determine whether to send a trigger signal to the valve to open the gas flow from the container to the airbag. The sensors may be indicative of conditions such as free fall, unusual acceleration, unusual velocity, unusual orientation proximate surfaces or objects, overheating, power loss, guidance/navigation or communication failure, flight control failure, instructions from an external device such as a remote terminal, or any other conditions. Such conditions may be indicative of a malfunction, in which case it may be desirable to deploy an airbag.

In some embodiments, a safety mechanism may be provided. The safety mechanism may be in place so that the airbag is prevented from deploying unless the safety mechanism is deactivated. This may advantageously prevent the airbag from deploying prematurely. For example, this may prevent an airbag from deploying and potentially injuring a user when a user is carrying a UAV. The safety mechanism may be deactivated manually by a user, or may be deactivated automatically when the aerial vehicle takes flight. In one example, the safety mechanism may be a pin that prevents the deployment of the airbag unless the pin is pulled out.

Various configurations of airbags may be provided. For example, an aerial vehicle may have one or more airbags below and/or above the aerial vehicle. The airbags may be distributed along any portion of the aerial vehicle, such as the aerial vehicle body, propulsion units, arms, control systems, communication interfaces, carrier, payload, passengers, landing gear, or any other portion.

Figure 1:
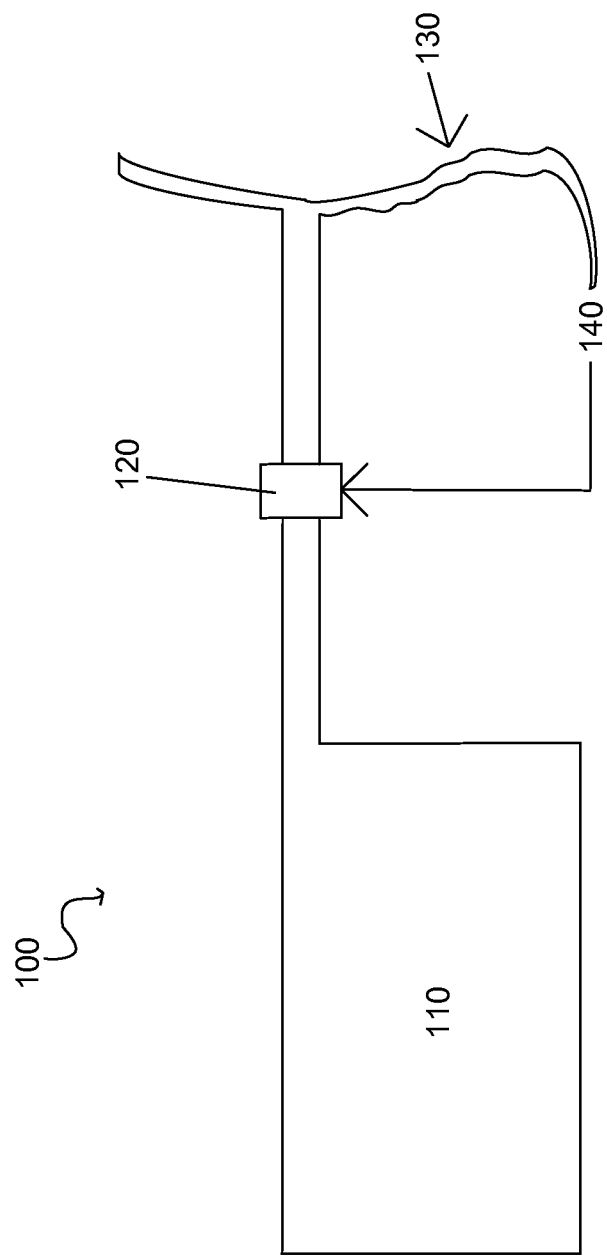
FIG. 1 shows an example of an impact protection apparatus for an aerial vehicle in accordance with an embodiment of the invention.

FIG. 1 shows an example of an impact protection apparatus 100 for an aerial vehicle in accordance with an embodiment of the invention. The impact protection apparatus may include a container 110 configured to enclose compressed gas, a gas valve 120, and an inflatable member 130. The gas valve may control flow of the gas from the container to the inflatable member. A controller 140 may be in communication with the gas valve and may control operation of the gas valve.

When an aerial vehicle experiences a malfunction, the inflatable member needs to be rapidly inflated with gas. A compressed gas technique may be used. The gas container 110 may be configured to contain a compressed gas. In some embodiments, the compressed gas may be carbon dioxide ($CO_2$). Other examples of compressed gases that may be used may include nitrogen. However, carbon dioxide may be a preferable gas as it is low cost, safe/not combustible, when becoming gas will not absorb too much heat like some other options. The container may be able to contain a gas that is provided at a high pressure. For example, the gas container may be capable of storing compressed gas that is greater than or equal to about 25 psi, 30 psi, 40 psi, 50 psi, 60 psi, 70 psi, 80 psi, 100 psi, 110 psi, 120 psi, 130 psi, 140 psi, 150 psi, 160 psi, 170 psi, 180 psi, 190 psi, 200 psi, 220 psi, 250 psi, 300 psi, 400 psi, 500 psi, 750 psi, 1000 psi, 2000 psi, 3000 psi, 4000 psi, or 5000 psi. In some embodiments, the gas container may be capable of storing compressed gas having a pressure that does not exceed 70 psi, 80 psi, 100 psi, 110 psi, 120 psi, 130 psi, 140 psi, 150 psi, 160 psi, 170 psi, 180 psi, 190 psi, 200 psi, 220 psi, 250 psi, 300 psi, 350 psi, 400 psi, 500 psi, 750 psi, 1000 psi, 2000 psi, 3000 psi, 4000 psi, 5000 psi, 6000 psi, 7000 psi, or 7500 psi. The gas container may be storing a compressed gas having a maximum pressure that falls between any of the pressure values mentioned herein. In some embodiments, the gas container pressure may fall within $0.2 \times 10^6$ Pa and $50 \times 10^6$ Pa.

A compressed gas container may be formed from any material known in the art, such as those capable of storing gas at the pressures mentioned above. Some examples of materials may include carbon steel, stainless steel or aluminium alloy. In some instances, plastics or polymers may be used to form the gas container. For example, if the pressure within the container is not too high, even a plastic soda bottle may be sufficient.

Using a compressed gas may advantageously provide a low cost compared to other inflation techniques. For example, inflation techniques using chemical reactions may be costly. However, in some implementations chemical reactions may occur for use during inflation. Alternatively, no chemical reactions occur for use during inflation. Pre-existing compressed gas containers may be utilized or adapted for use with the aerial vehicle. Currently small CO2 canisters are sold, which can be commonly used for filling bicycle tires when bicycle pumps are unavailable. Such canisters can be adapted for use to inflate an airbag. Pre-existing compressed gas canisters or containers may be retrofitted to provide gas for an aerial vehicle airbag.

One or more gas containers 110 may be provided on an aerial vehicle, such as a UAV. It may be advantageous for the gas containers to be relatively lightweight. For example, a gas container empty of gas may weigh less than or equal to about 3 grams, 5 grams, 7 grams, 10 grams, 15 grams, 20 grams, 30 grams, 35 grams, 40 grams, 50 grams, 60 grams, 70 grams, 100 grams, 150 grams, 200 grams, 250 grams, 300 grams, 400 grams, 500 grams, 700 grams, 1 kg, 1.5 kg, 2 kg, 3 kg, 4 kg 5 kg, 7 kg, or 10 kg. A gas container, when filled with compressed gas may weigh less than or equal to about 10 grams, 15 grams, 20 grams, 30 grams, 35 grams, 40 grams, 50 grams, 60 grams, 70 grams, 100 grams, 150 grams, 200 grams, 250 grams, 300 grams, 400 grams, 500 grams, 700 grams, 1 kg, 1.5 kg, 2 kg, 3 kg, 4 kg 5 kg, 7 kg, 10 kg, 15 kg, 20 kg, or 30 kg.

In some embodiments, it may also be advantageous for a gas container 110 to be of relatively small volume. For example, the gas container may be suitable sized to be carried by a UAV. In other embodiments, a gas container may be suitably sized to be carried by any type of aerial vehicle. For example, the gas container may have a volume less than or equal to about 0.001 $mm^3$, 0.005 $mm^3$, 0.01 $mm^3$, 0.1 $mm^3$, 1 $mm^3$, 10 $mm^3$, 100 $mm^3$, 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 2000 $cm^3$, 3000 $cm^3$, 5000 $cm^3$, 7000 $cm^3$, 10000 $cm^3$, 20000 $cm^3$, 50000 $cm^3$, or 100000 $cm^3$.

Gas from a gas container 110 may be used to inflate an inflatable member 130, which may function as an airbag. When not inflated, the inflatable member may have a deflated configuration. The deflated configuration may be folded, rolled, or bunched in on itself. When inflated, the inflatable member may be fully inflated and stretched under tension. The inflatable member may be formed from a flexible material, such as a fabric, bladder, elastomeric material, or any other material. In some examples, the inflatable member may be formed from a nylon fabric (e.g., nylon 6,6), polyester fabric, or polyvinyl chloride (PVC). The material may be resistant to low temperature since when the compressed gas is released, it may turn from a liquid state to a gas state, which can absorb heat from the surroundings.

When inflated, the inflatable member 130 may have a volume that is greater than a volume of the gas container 110. For example, the inflatable member may have a volume greater than or equal to 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 2000 $cm^3$, 3000 $cm^3$, 5000 $cm^3$, 7000 $cm^3$, 10000 $cm^3$, 20000 $cm^3$, 50000 $cm^3$, or 100000 $cm^3$. The inflatable member may have a volume less than or equal to 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 2000 $cm^3$, 3000 $cm^3$, 5000 $cm^3$, 7000 $cm^3$, 10000 $cm^3$, 20000 $cm^3$, 50000 $cm^3$, 100000 $cm^3$, 200000 $cm^3$, 500000 $cm^3$, 1 $m^3$, 1.5 $m^3$, 2 $m^3$, 5 $m^3$, or 10 $m^3$.

An inflatable member may take any shape. In some instances, the inflatable member may be substantially spherical, ellipsoidal, cylindrical, prismatic, torus-shaped, teardrop shaped, be a flattened sphere or ellipse or other polygon, bowl-shaped, or have any other shape when inflated. In some instances, multiple inflatable members may be provided on an aerial vehicle. The inflatable members may all have the same shape and/or size, or may have different shapes and/or size.

The inflatable member may be coupled to an aerial vehicle, such as a UAV. The inflatable member may be inflated to reduce forces experienced by the aerial vehicle or a load of the aerial vehicle during impact. In some instances, the forces may be reduced so that no more than 5%, 10%, 20%, 30%, 40%, 50%, 60%, 70%, 80%, or 90% of the force is transmitted compared to not having the inflatable member.

The inflatable member 130 may be connected to the gas container 110 via a channel, pipe, passage, opening, or other connection. A gas valve 120 may be provided between the inflatable member and the gas container. The gas valve may be positioned along the connector, such as the channel, pipe, passage, or opening. The gas valve may control flow of gas between the gas container and the inflatable member. In some instances, the gas valve may function as a gating mechanism for the flow of gas from the gas container to the inflatable member. The gas valve may have an open position that permits gas to flow between the gas container and the inflatable member. When the gas valve is in the open position, fluid communication may be provided between the interior of the gas container and interior of the inflatable member. The gas valve may have a closed position that may prevent gas from flowing between the gas container and the inflatable member. When the gas valve is in the closed position, fluid communication is not provided between the interior of the gas container and the interior of the inflatable member.

In some instances, the gas valve 120 may have a binary open and closed position. Alternatively, the gas valve may be proportional valves that may control the flow rate of the gas that flows between the gas container and the inflatable member. For example, a proportional valve may have a wide open configuration that may permit a greater rate of flow than a partially open configuration that may permit a lesser rate of flow. Optionally, regulating, throttling, metering or needle valves may be used. Return or non-return valves may be used. A valve may have any number of ports. For example, a two-port valve may be used. Alternatively, a three-port, four-port or other type of valve may be used in alternative configurations. Any description herein of valves may apply to any other type of flow control mechanism. The flow control mechanisms may be any type of binary flow control mechanism (e.g., containing only an open and closed position) or variable flow control mechanism (e.g., which may include degrees of open and closed positions).

Prior to inflation of the inflatable member 130, the gas valve 120 may be closed. The gas container 110 may contain the compressed gas therein, which may be prevented from flowing to the inflatable member by the closed gas valve. Thus, the pressure within the gas container may be higher than the pressure within the deflated inflatable member. A signal may be provided to a gas valve that may cause the gas valve to open. In some instances, signals to open the gas valve may be provided in response to a detected malfunction of the aerial vehicle. The signals may be generated in response to conditions of the aircraft that may be indicative that an impact may be imminent or likely. When the gas valve is opened, the compressed gas may flow from the gas container to the inflatable member, inflating the inflatable member. The gas may flow until the pressure within the gas container and the inflatable member is relatively equalized. The inflatable member may be rapidly inflated using the compressed gas. In some instances, the inflatable member may be fully inflated within 0.01 seconds, 0.05 seconds, 0.1 seconds, 0.2 seconds, 0.3 seconds, 0.4 seconds, 0.5 seconds, 0.6 seconds, 0.7 seconds, 0.8 seconds, 0.9 seconds, 1 second, 1.2 seconds, 1.5 seconds, 2 seconds, 3 seconds, or 5 seconds. In some embodiments, once the inflatable member has inflated, it may remain fully inflated. Alternatively, it may deflate over time.

A controller 140 may be provided that may control the gas valve 120, the gas valve controlling whether the gas will flow into the inflatable member 130 and therefore whether the inflatable member will inflate. The controller may generate a signal that may be provided to the gas valve to indicate whether to open or close the gas valve, or optionally the degree to which the gas valve may be opened. The controller may be in communication with an aircraft control mechanism that may control other functions of the aerial vehicle, such as propulsion, guidance, sensors, or communications. Alternatively, the controller that provides the signal the gas valve may be the aircraft control mechanism itself. The controller may be on-board the aircraft. Alternatively, the controller may be a device or part of a device external to the aircraft. The controller may include a processor that may perform one or more steps in accordance with non-transitory computer readable media that may define operation of the aerial vehicle. The processor may determine, based on data, whether to send the signal to the gas valve, or the type of signal to be sent. The processor may make this determination in accordance with calculations performed on the data or a subset of the data. The controller may have one or more memory units that may include non-transitory computer readable media that may comprise code, logic, or instructions for performing the one or more steps. The processor may generate a signal indicative of a malfunction of the aircraft, which may be used to open a gas valve. Alternatively, the controller may receive a signal indicative of the malfunction. The signal may be generated on-board the aerial vehicle or may be generated from an external device in communication with the aerial vehicle.

In one example, the controller may receive data from one or more sensors, or from another aircraft controller. Based on the data received by the controller, the controller, with aid of a processor, may generate a signal that it may send a signal to a gas valve. In some instances, the signal may cause a gas valve to open from a closed state. The signal may or may not dictate the degree to which the gas valve is opened. In some instances, the signal may cause a gas valve to close from an open state. In some embodiments, a default setting may be for a gas valve to be closed during operation of the aerial vehicle. The gas valve may be opened in the event of a detected malfunction or other type of specified event. Once the gas valve has opened, it may remain opened as the inflatable member may have already been inflated.

Figure 2:
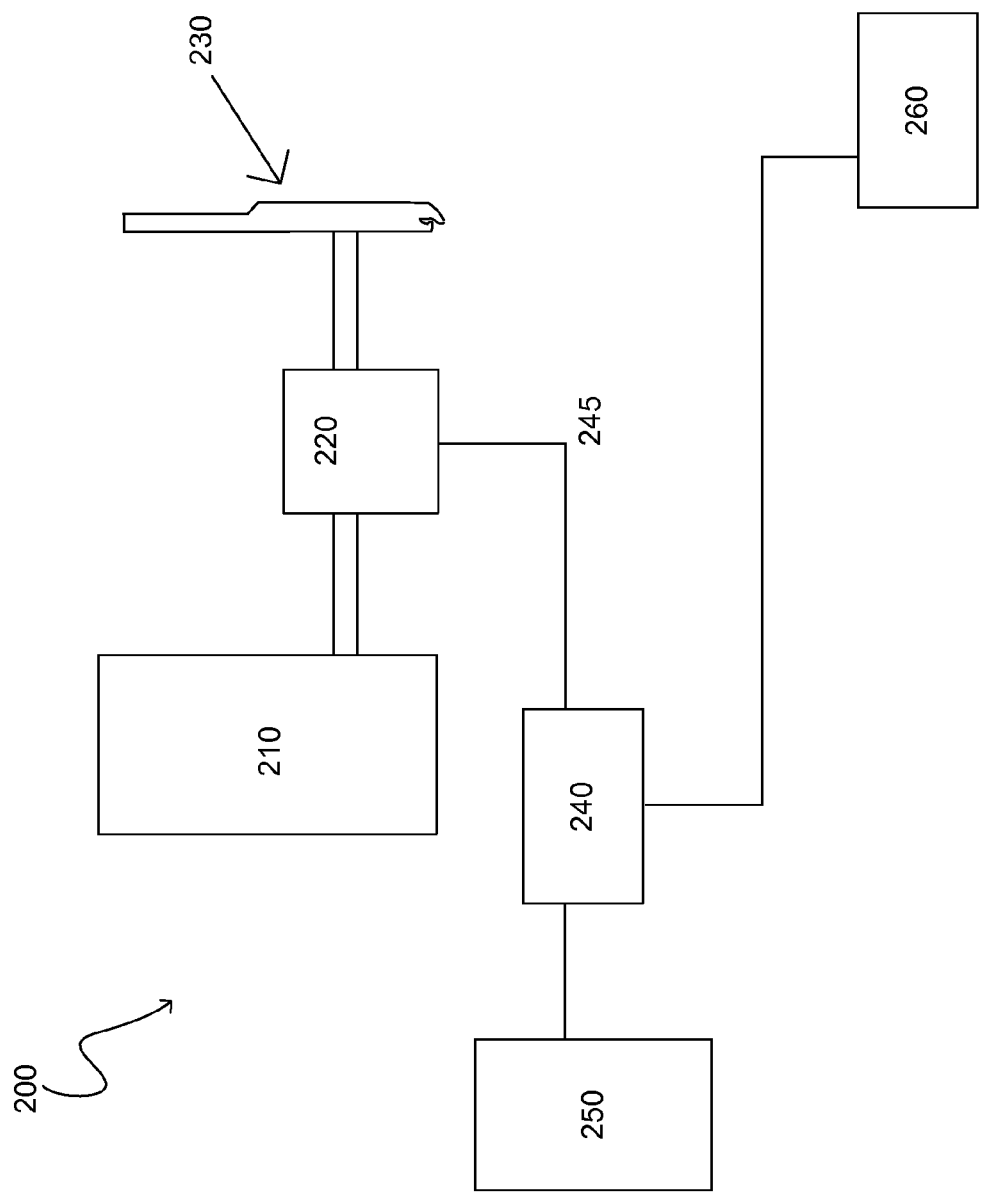
FIG. 2 shows another example of an impact protection apparatus for an aerial vehicle in accordance with an embodiment of the invention.

FIG. 2 shows another example of an impact protection apparatus 200 for an aerial vehicle in accordance with an embodiment of the invention. The impact protection apparatus may include a gas container 210 configured to enclose a pressurized gas, a gas valve 220, and an inflatable member 230. The gas valve may control flow of the gas from the container to the inflatable member. A valve controller 240 may be in communication with the gas valve and may control operation of the gas valve by a trigger signal 245 that may be sent to the gas valve. A valve controller power supply 250 may be provided and configured to provide power to the valve controller. The valve controller may communicate with an aircraft flight controller 260.

The gas container 210 may contain a pressurized gas. Any number of gas containers may be provided. The gas containers may be fluidically connected to one another. One or more gas containers may be controlled by a single valve 220. Alternatively, multiple valves may be provided. Causing a valve to open may cause gas to flow from the one or more gas containers into the inflatable member 230 which may function as an airbag for an aerial vehicle. In some instances, a single valve may control flow of gas to the inflatable member. Alternatively, multiple valves may be provided that may control flow of gas to the inflatable member. Optionally, each of the multiple valves may be connected to one or more different gas containers.

A valve controller 240 may be in communication with the gas valve 220 and may control operation of the gas valve by a trigger signal 245. The valve controller may send a signal to the gas valve to open from a closed state, thereby permitting flow of gas from the gas container 210 to the inflatable member 230. The valve controller may communicate with and control a single valve. Alternatively, the valve controller may communicate with and control multiple valves. The multiple valves may control flow of gas to a single inflatable member or multiple inflatable members. In some embodiments, a flow control mechanism may be provided that may control flow of gas from one or more containers to one or more inflatable members. The flow control mechanism may include one or more gas valves and one or more valve controllers. The trigger signal may be indicative of a malfunction of the aerial vehicle. Any description herein of a malfunction of the aerial vehicle may include or be applied to any state of the aerial vehicle in which a likelihood of impact may be increased or imminent. Any description herein of a malfunction of an aerial vehicle may be indicative of a state in which case it may be desirable to deploy one or more airbags.

The valve controller 240 may have a processor that may receive data from one or more sensors or one or more other controllers and generate a trigger signal 245 that may be sent to a valve 220. In some embodiments, one or more sensors may communicate directly with the valve controller. Alternatively, one or more sensors may communicate with an aircraft flight controller 260, which may communicate with the valve controller. In some embodiments, the same sensors may communicate directly with both the valve controller and the aircraft flight controller. The information from these same sensors may be useful for aircraft flight control and for airbag deployment. In some instances an aircraft flight controller may be a master controller that may control one or more multiple functions of the aircraft. Alternatively, the aircraft flight controller may communicate with the master controller. Any description herein of the aircraft flight controller may apply to a master controller and vice versa.

In one example, a valve controller 240 may have one or more on-board accelerometers. The valve controller may have other position detecting sensors, such as locators (e.g., GPS) or orientation sensors along one, two, or three different axes. The valve controller may have one or more other motion detecting sensors such as velocity detectors (e.g., for linear movement along one, two, or three axes, or angular rotation about one, two, or three axes), or acceleration detectors (e.g., for linear movement along one, two, or three axes, or angular rotation about one, two, or three axes). Alternatively, such sensors may be part of the aircraft flight controller 260 or may be in communication with both the valve controller and the aircraft flight controller. In some instances, position or motion detecting sensors may be used for the valve controller and aircraft flight controller.

An aircraft may include an inertial measurement unit (IMU). An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the aerial vehicle such that the motion of the aerial vehicle corresponds to motion of the IMU. Alternatively the IMU can be permitted to move relative to the aerial vehicle with respect to up to six degrees of freedom. The IMU can be directly mounted onto the aerial vehicle, or coupled to a support structure mounted onto the aerial vehicle. The IMU may be provided exterior to or within a housing of the aerial vehicle. The IMU may be permanently or removably attached to the aerial vehicle. The IMU can provide a signal indicative of the motion of the aerial vehicle, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the aerial vehicle, and the signal can be integrated once to provide velocity information, and twice to provide location and/or orientation information. The IMU may provide a signal to a valve controller and/or an aircraft flight controller.

Additional sensors may be provided on an aerial vehicle. For example, one or more sensors may be provided that may measure operation of one or more motors or other actuators, motor drives, rotors. For example, the sensors may detect the speed at which a rotor of an aerial vehicle is turning. The rotor may be part of a propulsion system of the aerial vehicle. The rotor may have one or more rotor blades may turn to generate lift for the aerial vehicle. In some instances, temperature sensors may be provided. Temperature sensors may be able to detect overheating of one or more component of the aerial vehicle. Power level sensors may also be provided. Power level sensors may detect a state of charge of a power supply, such as a battery or battery pack that may power the aerial vehicle. For example, if a power level sensor indicates that the aerial vehicle battery is running out of power, this may be indicative that the motor and flight control are running out of power. If the aerial vehicle battery has run out of power, this may indicate that the propulsion systems have run out of power and/or that the aircraft flight controller or master controller may be out of power.

Information from sensors may be analyzed to determine whether the aerial vehicle is in a state in which an airbag must be deployed. In one example, the state may be when a malfunction has occurred with the aerial vehicle. This may include conditions where the aerial vehicle exhibits a location or motion indicative of a malfunction (e.g., freefall, unusual acceleration, impact, proximity to a surface while traveling at a high speed, unusual orientation), when overheating is detected, when a short circuit or fire is detected, when a guidance or navigation system stops operating, when communication with an external device is lost, when a power supply is very low, when power to one or more components of the aerial vehicle is lost. For example, when the IMU data is abnormal, when there are issues with multiple motors, motor drives, or rotors, such that the aircraft cannot be stabilized, or when the aircraft impacts a building, a potential impact state may be determined where it may be desirable to inflate the airbag. A valve controller 240 may then trigger the valve 220 to be opened, the compressed gas will enter the deflated airbag 230 and inflate it.

One or more alert conditions may be provided which may contribute to detecting a potential impact state in which an airbag must be deployed. In some instances a single alert condition may be sufficient to trigger inflation of the airbag. Alternatively, certain combinations of alert conditions may be needed to trigger inflation of the airbag.

In one example, an alert condition may be provided when one or more sensors (e.g., accelerometers) of the aerial vehicle, such as a UAV, detect that the aerial vehicle is in free fall. The acceleration of the aerial vehicle may be reflective that the aerial vehicle is falling with an acceleration equal to that of gravity. In some instances, an alert condition may be provided when an acceleration of the aircraft is greater than an acceleration that the aircraft can produce. The alert condition may be triggered when this greater acceleration is detected downwards in the direction of gravity, or in any other direction. It may be desirable to trigger inflation of the airbag when the aerial vehicle is in free fall or moving with an acceleration that exceeds a predetermined threshold.

In another example, an alert condition may occur when the aircraft is traveling at a velocity that exceeds a predetermined threshold. Optionally, an alert condition may occur when the aircraft is traveling at a velocity that exceeds a predetermined threshold while the aircraft is within a predetermined proximity of a surface that it may impact. For example, if the aerial vehicle is at a low altitude (close to the ground) and is traveling downward at a velocity that exceeds a predetermined threshold, an alert condition may occur. In another example, if the aerial vehicle is close to a surface of a building and is heading toward the surface of the building at a velocity that exceeds a predetermined velocity, an alert condition may be raised. This may suggest that an impact is imminent and it may be desirable to inflate an airbag.

In another case, an alert condition may occur when the orientation of the aerial vehicle changes at a frequency that exceeds a predetermined threshold frequency or in a particular manner. For example, high frequency orientation changes or wobbling may be indicative of instability. The instability may indicate that the aerial vehicle will fall soon and/or that impact is imminent, for which inflation of an airbag may be desirable.

An alert condition may also occur when the orientation of the aerial vehicle is outside a predetermined range. For example, if the aerial vehicle (e.g., a UAV, such as a rotorcraft) is upside down a fall may be imminent and an alert condition may be provided. Similarly, if the aerial vehicle is oriented so that it is more than 90 degrees tilted relative to gravity (e.g., more upside down than right side up), an alert condition may be provided. The orientation of the aerial vehicle may indicate instability, loss of control of the vehicle, or that the aerial vehicle will plummet toward a surface, such as the ground, and may trigger inflation of an airbag.

The detected conditions of motors, motor drives, or rotors of an aerial vehicle may also pertain to the generation of an alert condition. For example, if a motor that is driving a propulsion unit has stopped, an alert condition may be provided. Similarly, if it is detected that a rotor has stopped rotating or is rotating below a predetermined threshold, an alert condition may occur. In some instances, calculations may be performed to determine whether other motors or rotors are compensating for the stopped/slowed motor or rotor. If compensation is not sufficient, the stopping of the motor or rotor may indicate the aerial vehicle will lose propulsion (e.g., lift) or control, and may fall or suffer an impact. This may trigger inflation of airbag.

Additionally an alert condition may be provided when a temperature sensor detects overheating of one or more component of the aerial vehicle. When the sensed temperature exceeds a predetermined threshold temperature, overheating may be indicated. Overheating may be indicative that a portion of the aerial vehicle may stop working, or that safety mechanisms may kick in to shut off the portion of the aerial vehicle. The shut-off of certain portions of the aerial vehicle (e.g., propulsion) may cause the aerial vehicle to fall or suffer an impact. The shut-off of other portions of the aerial vehicle (e.g., navigation/communication) may cause the aerial vehicle to operate blindly or without control, which may also lead to impact or damage to the aerial vehicle. A release of an airbag may be desirable in such situations.

Further alert conditions may occur when a power charge level of a power supply is low. For example, an aerial vehicle may have one or more power supplies, such as batteries or battery packs powering portions of the aerial vehicle. For example, one or more power supplies may power the entire aerial vehicle, or different portions or systems of the aerial vehicle. For example, a single power supply may power the propulsion of the aerial vehicle, the guidance/navigation of the aerial vehicle, a communication interface of the aerial vehicle, a carrier of the aerial vehicle, a payload of the aerial vehicle, a sensing system (e.g., IMU) of the aerial vehicle, and/or any other system of the aerial vehicle. Alternatively, different power supplies may power one or more different portions or systems of the aerial vehicle. When the power supply charge level drops beneath a predetermined threshold, this may indicate that the power will soon be lost to the portion or system powered by the power supply, which will generate an alert condition. For example, when a power supply powering a propulsion system of the aerial vehicle drops beneath a threshold charge value, an alert condition may occur. This may indicate that the propulsion system may not operate properly or will shut down soon. This may lead to the fall or impact of the aerial vehicle, which may cause an airbag to be inflated. In another example, a power supply powering a guidance/navigation system or a communication system of the aerial vehicle may drop beneath a threshold charge value, which may cause an alert condition. This may indicate that the aerial vehicle may operate blindly or without control, which may lead to impact or damage to the aerial vehicle. This may further cause deployment of an airbag.

Similarly, an alert condition may be provided if power is no longer supplied to the aerial vehicle or one or more system of the aerial vehicle. For example, if the propulsion system loses power, the propulsion units may stop working, which may cause the aerial vehicle to fall. In another example, if the guidance/navigation systems or communication systems lose power, this could lead to blind operation or instability of the aerial vehicle, which may raise the likelihood of impact. If certain sensors lose power this may prevent the guidance/navigation from operating properly. Loss of power conditions may case an airbag to be deployed.

A valve controller power supply 250 may be provided as part of an impact protection apparatus. The valve controller power supply may provide power to a valve controller 240. The valve controller power supply may also provide power to a valve 220. The valve controller power supply may supply power to a flow control mechanism, which may include one or more valve controllers and one or more valves. The valve controller power supply may be a power supply independent of other power supplies of the aerial vehicle. A flow control mechanism may be capable of functioning to cause inflation of an inflatable member, even if other power supplies of the aerial vehicle no longer function. Even if the rest of the aerial vehicle loses power, a valve controller may detect a condition to send a trigger signal to a valve, and the valve may be able to open in response to the signal, thereby permitting gas to flow into the inflatable member. For example, the valve controller power supply may be a different power supply from the rest of the aerial vehicle. The valve controller power supply may be independent of a propulsion power supply. Thus, even if the propulsion units lose power the valve controller power supply may still supply power to the valve controller and/or valve. Similarly, the valve controller power supply may be independent of an aircraft flight controller or master controller power supply. Thus, even if power is lost to the aircraft flight controller, the valve controller may make the determination whether to provide a trigger signal 245 to the valve 220. The valve controller may provide a trigger signal to the valve when it is detected that power has been lost to the aircraft flight controller or the master controller. The valve controller may power supply may also be independent of a guidance system and/or communication system power supply. Thus, even if the aerial vehicle is no longer operating with functional navigation or guidance controls, or has lost communication with an external device, such as a remote terminal, the valve control power supply may still supply power to the valve controller.

Having a valve controller power supply 250 that is independent of other power supplies of the aerial vehicle may advantageously permit triggering of an airbag when power is lost to the rest of the aerial vehicle. Power loss to the rest of the aerial vehicle may be one of the conditions in which case inflating an airbag is important. This provides advantages over traditional systems where the master control is powered with the same power supply as the valve controller. In those situations, if the battery runs out of power, the motor and flight control are also out of power. If the master control fails there is no way to transmit a trigger signal to inflate an airbag, which may be at one of the most crucial points. Thus, systems, methods, and devices provided herein advantageously provide a separately powered valve control.

The valve controller power supply may include one or more batteries. The batteries may be primary (e.g., single use) batteries or secondary (e.g., rechargeable) batteries. The state of charge of the valve controller power supply may or may not be monitored. In some instances, the valve controller power supply may be recharged periodically or in response to one or more events. In some instances, the valve controller power supply may be automatically recharged while a motor of the propulsion unit is operating.

In some instances, a single separate valve controller power supply 250 may be provided dedicated to the valve controller 240. Alternatively, multiple valve controller power supplies may be provided, which may function as back-ups to one another. Redundancy of any of the components described herein may be provided.

Figure 3:
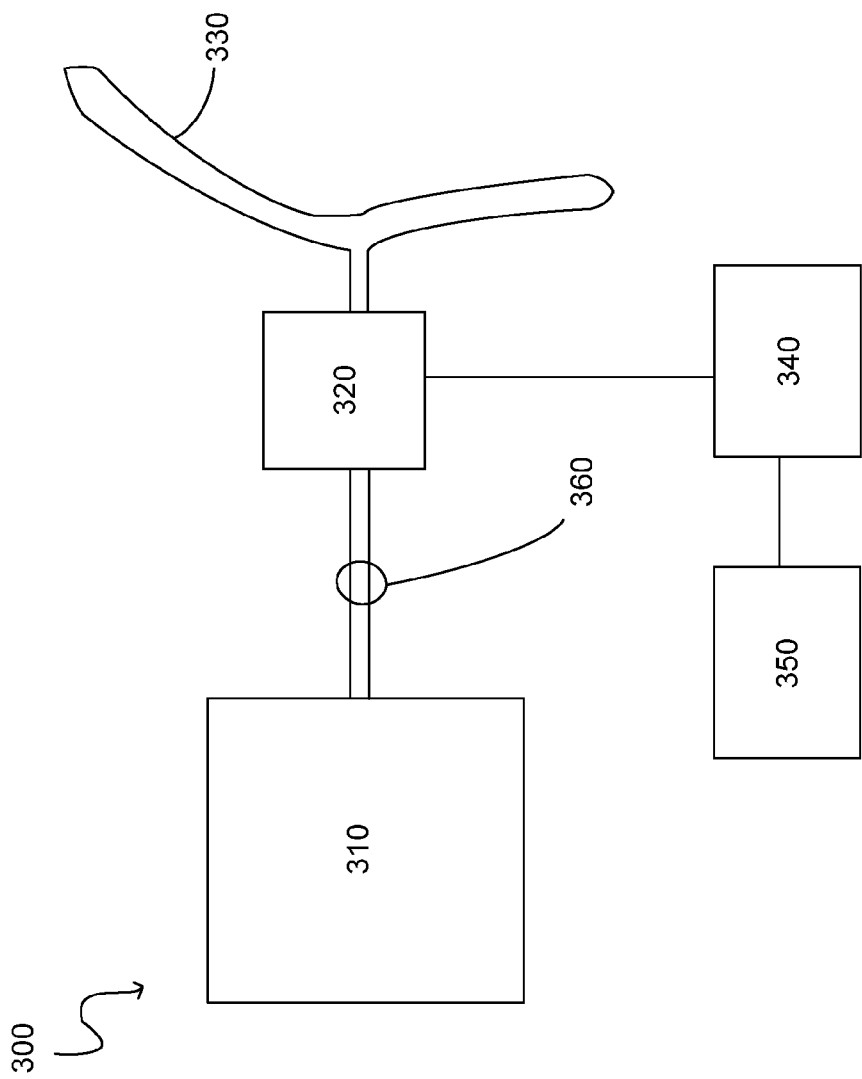
FIG. 3 shows an example of an impact protection apparatus utilizing a safety mechanism in accordance with an embodiment of the invention.

FIG. 3 shows an example of an impact protection apparatus 300 utilizing a safety mechanism in accordance with an embodiment of the invention. The impact protection apparatus may be provided for an aerial vehicle, such as a UAV. The impact protection apparatus may include a container 310 configured to enclose a fluid, a flow control valve 320, and an inflatable member 330. The gas valve may control flow of the gas from the container to the inflatable member. A valve controller 340 may be in communication with the gas valve and may control operation of the gas valve by a trigger signal 345 that may be sent to the gas valve. A valve controller power supply 350 may be provided and configured to provide power to the valve controller. A safety mechanism 360 may be provided that, unless deactivated, prevents inflation of the inflatable member.

A container 310 may contain a fluid, such as a gas. Preferably, the fluid may be a compressed gas. Alternatively, the fluid may include a liquid, or a mixture of gas and liquid. The fluid may be pressurized or compressed. The fluid may be delivered to the inflatable member 330 to cause the inflatable member to inflate. The flow control valve 320 may control flow of the fluid from the container to the inflatable member. In some instances, the valve may initially be at a closed state which may prevent flow of the fluid from the container to the inflatable member. The valve may be opened in response to a signal from a valve controller 340. Opening the valve may cause the fluid from the container to enter the inflatable member, and inflate the inflatable member.

The valve controller 340 may be powered by a valve controller power supply 350. The valve controller power supply may be independent of one or more other power supplies of the aerial vehicle. For example, the valve controller power supply may be independent of a power supply powering a propulsion mechanism of the aerial vehicle, or a master controller of the aerial vehicle. The valve controller may be capable of operating even when the rest of the aerial vehicle runs out of power, or is shut down. Thus, a valve controller may provide a signal to trigger inflation of the inflatable member, regardless of whether the rest of the aerial vehicle is operational or not. The valve controller may send the trigger signal in response to one or more signal or sensor input. The valve controller may perform analysis of the signal or sensor input in order to determine whether to provide the trigger signal. The valve controller may make such determinations on a continuous, periodic, or episodic basis.

In another example, the valve controller may provide a trigger signal in response to a signal from a terminal that is remote to the aerial vehicle. The terminal may communicate with the aerial vehicle. In some instances, the terminal may control positioning, orientation, or flight of the aerial vehicle. The terminal may receive data from the aerial vehicle, such as location or flight information, or data collected by a payload of the aerial vehicle. In some instances, a user may provide an input to the terminal to trigger deployment of the airbag remotely. For example, a user may witness that the aerial vehicle is about to impact something, and may remotely trigger the airbag inflation. The communication system with the terminal may be powered by the valve controller power supply 350 or another power supply. In some instances, the communication from the terminal to the valve controller 340 may occur, even if other parts of the aerial vehicle (e.g., propulsion unit, flight controller, master controller, guidance/navigation) are failing.

In some embodiments, a safety mechanism 360 may be provided that, unless deactivated, prevents inflation of the inflatable member. In some instances, the default of the safety mechanism may be to be on and to prevent inflation of the inflatable member. This may prevent an airbag from deploying prematurely. For example, this may prevent the airbag from deploying and injuring a person when the aircraft is being carried by the person. This may prevent an airbag from deploying while the aircraft is not on (or is not supposed to be on but erroneously turned off), or is being transported by an individual. In one example, after a flight control of the aerial vehicle is turned on or enabled, the propulsion units of the aerial vehicle (e.g., rotors) may begin to function for flight. When the flight control is turned on, a signal may be transmitted to a safety mechanism, which will be deactivated (or be turned 'off'). Deactivating the safety mechanism may permit the airbag to deploy in response to a trigger signal from a valve controller 340. The safety mechanism may be deactivated by a safety signal indicating that the unmanned aerial vehicle is in operation. The safety signal may be provided by a flight control system of the unmanned aerial vehicle or another system of the unmanned aerial vehicle.

In another embodiment, the safety mechanism 360 may include a safety pin. The safety pin can be provided, similar to a fire extinguisher, so that if the pin is not pulled, the airbag cannot inflate. In some embodiments, the safety mechanism comprises a pin and deactivation of the safety mechanism may comprise removal of the pin. The pin may be configured to be removed by a user prior to operation of the aerial vehicle. The pin may be manually removed by the user prior to the aerial vehicle being permitted to operate. In some instances, the aerial vehicle may not be capable of operating without removing the safety pin first. In another example, turning on the aerial vehicle or operating the aerial vehicle may automatically cause the safety pin to be removed.

In accordance with various embodiments of the invention, there may be a single container or multiple containers. The topology may be a single large container connected to a plurality of inflatable members; or a single small container for a single inflatable member. Alternatively, multiple containers may be provided for a single inflatable member. Each inflatable member may be controlled by a single valve or multiple valves. Each valve may have its own valve controller or multiple valves may share a valve controller. A single valve controller power supply may be provided for a single valve controller or for multiple valve controllers. In some instances, multiple single valve controller power supplies may be provided for a single valve controller or for the multiple valve controllers. A single safety mechanism may be provided for a single valve or valve controller, or for multiple valves or valve controllers. In some instances, multiple safety mechanisms may be provided for multiple valves or valve controllers.

Figure 4:
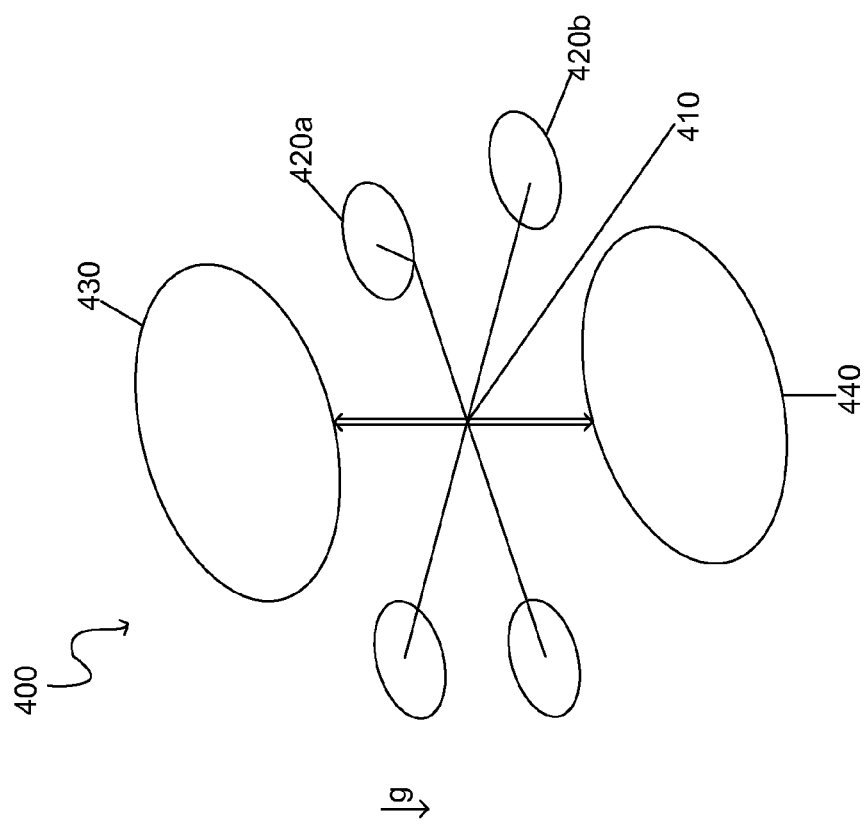
FIG. 4 shows an example of an unmanned aerial vehicle (UAV) with deployed airbags.

FIG. 4 shows an example of an unmanned aerial vehicle (UAV) 400 with deployed airbags. Any description herein of a UAV may apply to any other type of movable object, such as any type of aerial vehicle, and vice versa. In some embodiments, a UAV may have a UAV body 410 or hub. One or more propulsion units 420a, 420b may be provided for a UAV. In some embodiments, an airbag may be deployed above 430 the UAV, and an airbag may be deployed beneath 440 a UAV.

The UAV may have a lightweight body 410. The UAV may have a weight as described further elsewhere herein. The UAV may have small dimensions. The UAV may have any dimensions as described further elsewhere herein. The UAV may be capable of being lifted by a human being using one hand or two hands.

The UAV may have one or more propulsion units 420. The propulsion units may include one or more actuator-driven rotor. The rotor may include one or more rotor blades. The rotor, including the rotor blades, may rotate about an axis of rotation. In one example, a UAV may have a plurality of arms, each arm having a propulsion unit thereon. The arms may be connected to the lightweight body 410 at a proximal end. The propulsion units may be provided at or near a distal end of the arm. For example, the propulsion units may be within 50%, 40%, 30%, 25%, 20%, 15%, 10%, 5%, 3%, or 1% of the arm length from the distal end of the arm. The propulsion units may be oriented vertically to provide lift for the UAV. In some instances, one or more propulsion units may be angled or oriented sideways to provide lateral thrust for the UAV. Any number of arms and/or propulsion units may be provided. For example, one, two, three, four, five, six, seven, eight, nine, ten or more arms and/or propulsion units may be provided.

One or more airbags may be provided for the UAV. In some embodiments, a single airbag may be configured to be deployed below the UAV. Alternatively a single airbag may be configured to be deployed above the UAV. In some embodiments, multiple airbags may be provided. The multiple airbags may be configured to be deployed below the UAV, above the UAV, or any combination of below and above the UAV. For example one or more airbags may be deployed below the UAV and one or more airbags may be deployed above the UAV. In some instances, one or more airbags may be configured to be deployed to a side of the UAV.

The one or more airbags may be deployed from any portion of the UAV. For example, one or more of the airbags may be configured to deploy from the UAV body 410. Similarly, one or more airbags may be configured to deploy from a central portion of the UAV, or from a hub of the UAV where one or more arms may join. A deflated airbag may be contained within a housing or may be partially enclosed by a housing of the body or portion of the UAV. Alternatively, the deflated airbag may be provided outside a body housing or may be at least partially exposed. The airbag may be coupled to the UAV in any manner. In one example, a large airbag may be deployed above the UAV 430 from the UAV body and beneath the UAV 440 from the UAV body. In some embodiments, an 'upward' portion of the UAV may be a portion above the UAV arms in the direction of lift when the propulsion units are operating. In some embodiments, a 'downward' portion of the UAV may be a portion below the UAV arms and oriented opposite the direction of lift when the propulsion units are operating. When deploying, the airbag may be configured to pass through an opening of a UAV body housing, or to cause a portion of a UAV body housing to come off. Alternatively, the UAV body need not be affected when the airbag deploys.

In some embodiments, a UAV may be oriented during controlled flight so that a 'downward' portion of the UAV is in the direction of gravity g, while an 'upward' portion is opposite the direction of gravity g. The UAV may change orientation when out of control (e.g., flip) so that the upward portion of the UAV is facing toward the earth and the downward portion of the UAV is facing toward the sky. In such situations it may be advantageous to have airbags that may deploy above and below the UAV. In some instances, the UAV may tumble while falling, so it may be difficult to predict which side the UAV may land. In such situations it would be advantageous to have airbags on multiple sides of the UAV to protect the UAV when landing at an unpredictable angle.

The airbags may be sufficiently sized so that a single airbag can sufficiently reduce the force of impact of the UAV. The airbags may sufficiently reduce the force of the impact of the UAV to prevent any damage or significant damage to the UAV. The volume of the one or more inflated airbags may be greater than the volume of the UAV. Alternatively, the volume of the one or more inflated airbags may be equal to the volume of the UAV, or be less than the volume of the UAV. For example, the ratio of a volume of an inflated airbag to a volume of a UAV may be less than or equal to about 5:1, 4:1, 3:1, 2:1, 1.5:1, 1.2:1, 1:1, 1:1.2, 1:1.5, 1:2, 1:3, 1:4, or 1:5. The ratio of a volume of an inflated airbag to a volume of a UAV may be greater than or equal to about 2:1, 1.5:1, 1.2:1, 1:1, 1:1.2, 1:1.5, 1:2, 1:3, 1:4, 1:5, or 1:6. The ratio of a footprint of an inflated airbag to a footprint of the UAV may be less than or equal to about 3:1, 2:1, 1.5:1, 1.2:1, 1:1, 1:1.2, 1:1.5, 1:2, 1:3, 1:4, or 1:5. The ratio of a footprint of an inflated airbag to a footprint of the UAV may be greater than or equal to about 2:1, 1.5:1, 1.2:1, 1:1, 1:1.2, 1:1.5, 1:2, 1:3, 1:4, 1:5, or 1:6.

Figure 5:
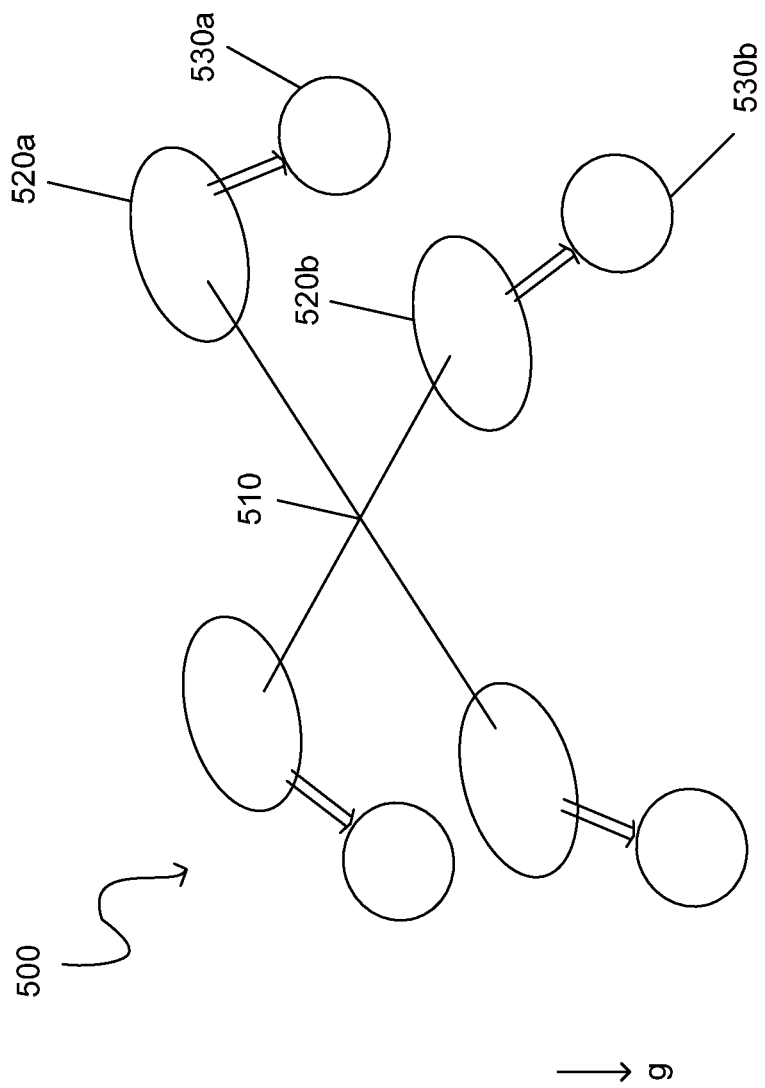
FIG. 5 shows another example of an unmanned aerial vehicle (UAV) with deployed airbags.

FIG. 5 shows another example of an unmanned aerial vehicle (UAV) 500 with deployed airbags. In some embodiments, a UAV may have a UAV body 510 or hub. One or more propulsion units 520a, 520b may be provided for a UAV. In some embodiments, an airbag 530a, 530b may be deployed proximate to the propulsion units.

The UAV may have a lightweight and/or small body 510. The UAV may be capable of being lifted by a human being using one hand or two hands.

The UAV may have one or more propulsion units 520a, 520b. The UAV may be a rotorcraft with one or more rotors having rotor blades capable of generating lift when rotating at a sufficiently fast speed. The propulsion units may be oriented vertically to provide lift for the UAV. In some instances, one or more propulsion units may be angled or oriented sideways to provide lateral thrust for the UAV. Any number of arms and/or propulsion units may be provided. For example, one, two, three, four, five, six, seven, eight, nine, ten or more arms and/or propulsion units may be provided. The arms may extend radially from a central hub or body 510 of the UAV. The arms may be substantially coplanar. In some instances, the propulsion units may be substantially coplanar.

One or more airbags may be provided for the UAV. The airbags may be configured to deploy near a propulsion unit of the UAV. In some embodiments, a single airbag may be configured to be deployed below the propulsion unit. Alternatively a single airbag may be configured to be deployed above the propulsion unit. In some embodiments, multiple airbags may be provided. The multiple airbags may be configured to be deployed below the propulsion unit, above the propulsion unit, or any combination of below and above the propulsion unit. For example one or more airbags may be deployed below the UAV and one or more airbags may be deployed above the propulsion unit. In some instances, one or more airbags may be configured to be deployed to a side of the propulsion unit. The propulsion unit may be surrounded by one or more airbags from different sides when they are deployed.

The one or more airbags may be deployed from any portion of the UAV. For example, one or more of the airbags may be configured to deploy from the propulsion unit or an area proximate to the propulsion unit. In some embodiments, airbags may be deployed from one or arm near the propulsion unit. The airbags may be deployed from one or more arm at within 50%, 40%, 30%, 25%, 20%, 15%, 10%, 5%, 3%, or 1% of the arm length from the distal end of the arm. The airbags may be deployed at within 30%, 25%, 20%, 15%, 10%, 5%, 3%, or 1% of the arm length from the propulsion unit's location on the arm. A deflated airbag may be contained within a housing or may be partially enclosed by a housing of an arm or propulsion unit of the UAV. Alternatively, the deflated airbag may be provided outside a housing or may be at least partially exposed. In one example, an airbag may be deployed substantially beneath 530a, 530b the propulsion unit and/or to the side of the propulsion unit. Each propulsion unit may have one or more airbags deployed in proximity. In some embodiments, multiple airbags may be deployed in the proximity of each propulsion unit. The air bags may be clustered around the propulsion units. When deploying, the airbag may be configured to pass through an opening of a UAV arm housing or propulsion unit housing, or to cause a portion of a UAV housing to come off. Alternatively, the UAV structure need not be affected when the airbag deploys.

The airbags may be sufficiently sized so that a single airbag can sufficiently reduce the force of impact of the propulsion units and/or the body of the UAV. The airbags may sufficiently reduce the force of the impact of the propulsion unit to prevent any damage or significant damage to the propulsion units and/or the body of the UAV. The volume of the one or more inflated airbags may be greater than the volume of the propulsion unit. Alternatively, the volume of the one or more inflated airbags may be equal to the volume of the propulsion unit, or be less than the volume of the propulsion unit. For example, the ratio of a volume of an inflated airbag to a volume of a propulsion unit may be less than or equal to about 5:1, 4:1, 3:1, 2:1, 1.5:1, 1.2:1, 1:1, 1:1.2, 1:1.5, 1:2, 1:3, 1:4, or 1:5. The ratio of a volume of an inflated airbag to a volume of a propulsion unit may be greater than or equal to about 2:1, 1.5:1, 1.2:1, 1:1, 1:1.2, 1:1.5, 1:2, 1:3, 1:4, 1:5, or 1:6. The ratio of a footprint of an inflated airbag to a footprint of the propulsion unit may be less than or equal to about 3:1, 2:1, 1.5:1, 1.2:1, 1:1, 1:1.2, 1:1.5, 1:2, 1:3, 1:4, or 1:5. The ratio of a footprint of an inflated airbag to a footprint of the propulsion unit may be greater than or equal to about 2:1, 1.5:1, 1.2:1, 1:1, 1:1.2, 1:1.5, 1:2, 1:3, 1:4, 1:5, or 1:6.

The position and number of airbags depends on an aircraft model, size, volume, weight, and other factors. For example, smaller airbags may be used or fewer airbags may be used for a UAV, than an aircraft that is designed to carry one or more passengers. The airbags may be configured to protect the aerial vehicle from one angle or multiple angles. For example, the airbags may be configured to reduce the forces experienced by the aerial vehicle when impact occurs beneath the aerial vehicle, above the aerial vehicle, a side of the aerial vehicle, and/or any other angle of the aerial vehicle.

All airbags may be deployed simultaneously. In some instances, detecting a state in which the airbags ought to be deployed may result in all airbags of the aerial vehicle being deployed. In some instances, this may be advantageous in situations where it may be difficult to predict which side the aerial vehicle may impact a surface or other device. Alternatively, a selected number of airbags may be deployed. For example, if it is detected that the impact will likely come from a bottom side of the aerial vehicle, airbags on the bottom side of the aerial vehicle may be deployed. Alternatively, if it is detected that the impact will likely from the top or side of the aerial vehicle, airbags on the top and/or side may be deployed.

Deployment of the airbags may reduce damage likely to be taken by the aerial vehicle upon impact. Similarly, deployment of airbags may reduce damage or injury to a load of an aerial vehicle, such as a payload (e.g., camera, illumination devices, audio devices, measurement or sensing equipment), passengers, or any other item carried by or attached to the aerial vehicle. Impact may occur when an aerial vehicle impacts a surface (e.g., ground, wall, ceiling, water, cliffs), possible obstructions (e.g., trees, foliage, people or other living beings, poles, lighting units, power lines, billboards, buildings), or moving objects (e.g., other aerial vehicles, other types of vehicles, living beings).

The systems, devices, and methods described herein can be applied to a wide variety of movable objects. As previously mentioned, any description herein of an aerial vehicle may apply to and be used for any movable object. In some embodiments, any description herein of an aerial vehicle may apply to a UAV.

A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 6:
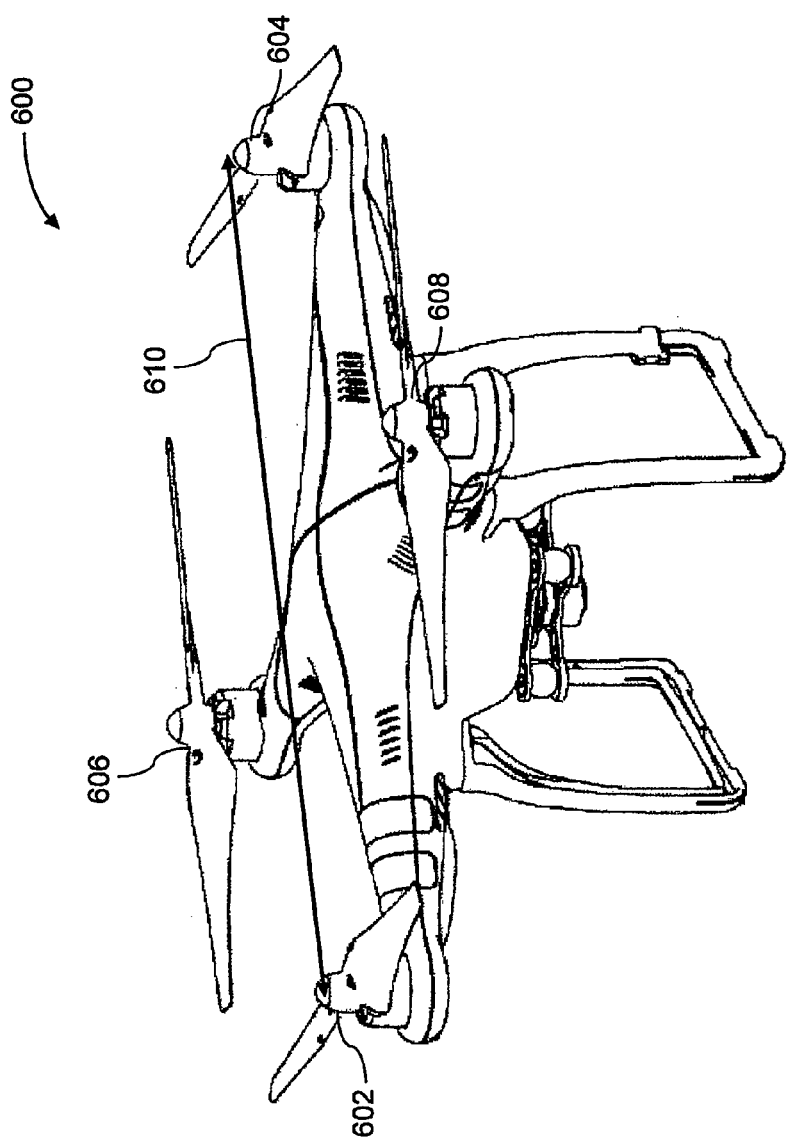
FIG. 6 illustrates an unmanned aerial vehicle (UAV), in accordance with embodiments of the present invention.

FIG. 6 illustrates an unmanned aerial vehicle (UAV) 600, in accordance with embodiments of the present invention. The UAV may be an example of a movable object as described herein. The UAV 600 can include a propulsion system having four rotors 602, 604, 606, and 608. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 610. For example, the length 610 can be less than or equal to 2 m, or less than equal to 5 m. In some embodiments, the length 610 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

One or more airbags may be deployed in the event of a detected state, such as a malfunction. The airbags may be deployed to reduce forces experienced upon impact. The airbags may be deployed to protect any portion of the movable object, and/or load of the object. The airbags may be deployed to protect the payload or carrier of the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 7:
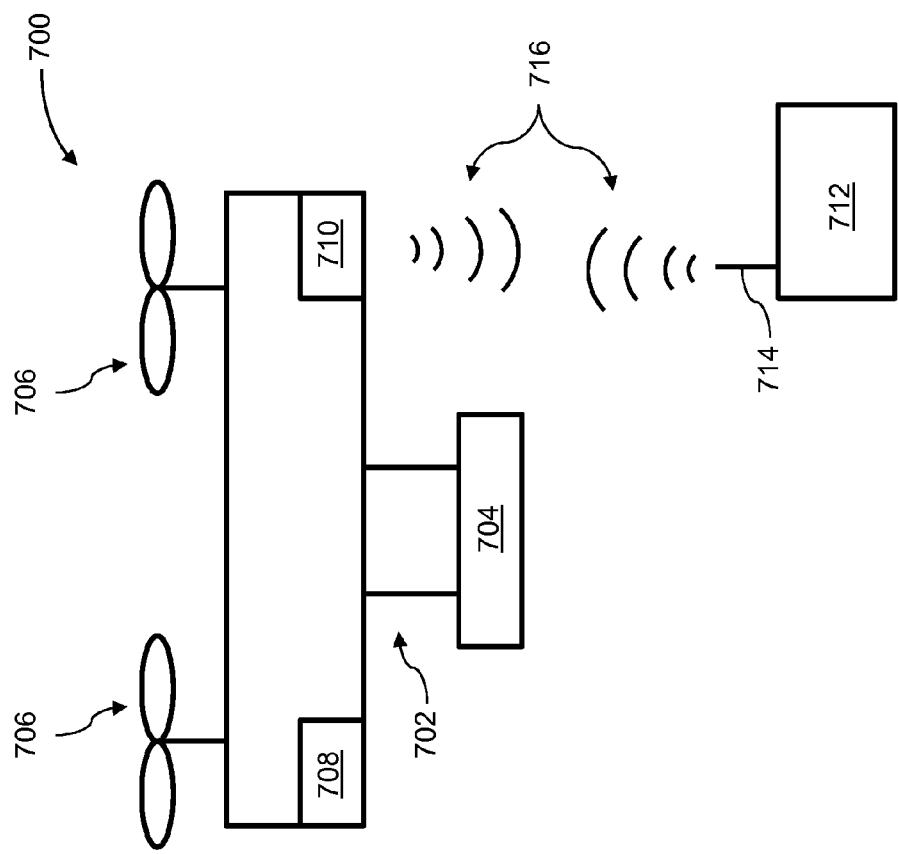
FIG. 7 illustrates a movable object including a carrier and a payload, in accordance with embodiments.

FIG. 7 illustrates a movable object 700 including a carrier 702 and a payload 704, in accordance with embodiments. Although the movable object 700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 704 may be provided on the movable object 700 without requiring the carrier 702. The movable object 700 may include propulsion mechanisms 706, a sensing system 708, and a communication system 710.

The propulsion mechanisms 706 can include one or more of rotors, propellers, blades, engines, motors, wheels, axles, magnets, or nozzles, as previously described. For example, the propulsion mechanisms 706 may be rotor assemblies, or other rotary propulsion units. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 706 can be mounted on the movable object 700 using any suitable means, such as a support element (e.g., a drive shaft) as described elsewhere herein. The propulsion mechanisms 706 can be mounted on any suitable portion of the movable object 700, such on the top, bottom, front, back, sides, or suitable combinations thereof.

In some embodiments, the propulsion mechanisms 706 can enable the movable object 700 to take off vertically from a surface or land vertically on a surface without requiring any horizontal movement of the movable object 700 (e.g., without traveling down a runway). Optionally, the propulsion mechanisms 706 can be operable to permit the movable object 700 to hover in the air at a specified position and/or orientation. One or more of the propulsion mechanisms 700 may be controlled independently of the other propulsion mechanisms. Alternatively, the propulsion mechanisms 700 can be configured to be controlled simultaneously. For example, the movable object 700 can have multiple horizontally oriented rotors that can provide lift and/or thrust to the movable object. The multiple horizontally oriented rotors can be actuated to provide vertical takeoff, vertical landing, and hovering capabilities to the movable object 700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 700 (e.g., with respect to up to three degrees of translation and up to three degrees of rotation).

The sensing system 708 can include one or more sensors that may sense the spatial disposition, velocity, and/or acceleration of the movable object 700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 708 can be used to control the spatial disposition, velocity, and/or orientation of the movable object 700 (e.g., using a suitable processing unit and/or control module, as described below). Alternatively, the sensing system 708 can be used to provide data regarding the environment surrounding the movable object, such as weather conditions, proximity to potential obstacles, location of geographical features, location of manmade structures, and the like. The sensing system data may be useful in determining conditions under which to deploy one or more airbags of the movable object.

The communication system 710 enables communication with terminal 712 having a communication system 714 via wireless signals 716. The communication systems 710, 714 may include any number of transmitters, receivers, and/or transceivers suitable for wireless communication. The communication may be one-way communication, such that data can be transmitted in only one direction. For example, one-way communication may involve only the movable object 700 transmitting data to the terminal 712, or vice-versa. The data may be transmitted from one or more transmitters of the communication system 710 to one or more receivers of the communication system 712, or vice-versa. Alternatively, the communication may be two-way communication, such that data can be transmitted in both directions between the movable object 700 and the terminal 712. The two-way communication can involve transmitting data from one or more transmitters of the communication system 710 to one or more receivers of the communication system 714, and vice-versa.

In some embodiments, the terminal 712 can provide control data to one or more of the movable object 700, carrier 702, and payload 704 and receive information from one or more of the movable object 700, carrier 702, and payload 704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 706), or a movement of the payload with respect to the movable object (e.g., via control of the carrier 702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 708 or of the payload 704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 712 can be configured to control a state of one or more of the movable object 700, carrier 702, or payload 704. Alternatively or in combination, the carrier 702 and payload 704 can also each include a communication module configured to communicate with terminal 712, such that the terminal can communicate with and control each of the movable object 700, carrier 702, and payload 704 independently.

In some embodiments, the movable object 700 can be configured to communicate with another remote device in addition to the terminal 712, or instead of the terminal 712. The terminal 712 may also be configured to communicate with another remote device as well as the movable object 700. For example, the movable object 700 and/or terminal 712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 700, receive data from the movable object 700, transmit data to the terminal 712, and/or receive data from the terminal 712. Optionally, the remote device can be connected to the Internet or other telecommunications network, such that data received from the movable object 700 and/or terminal 712 can be uploaded to a website or server.

Figure 8:
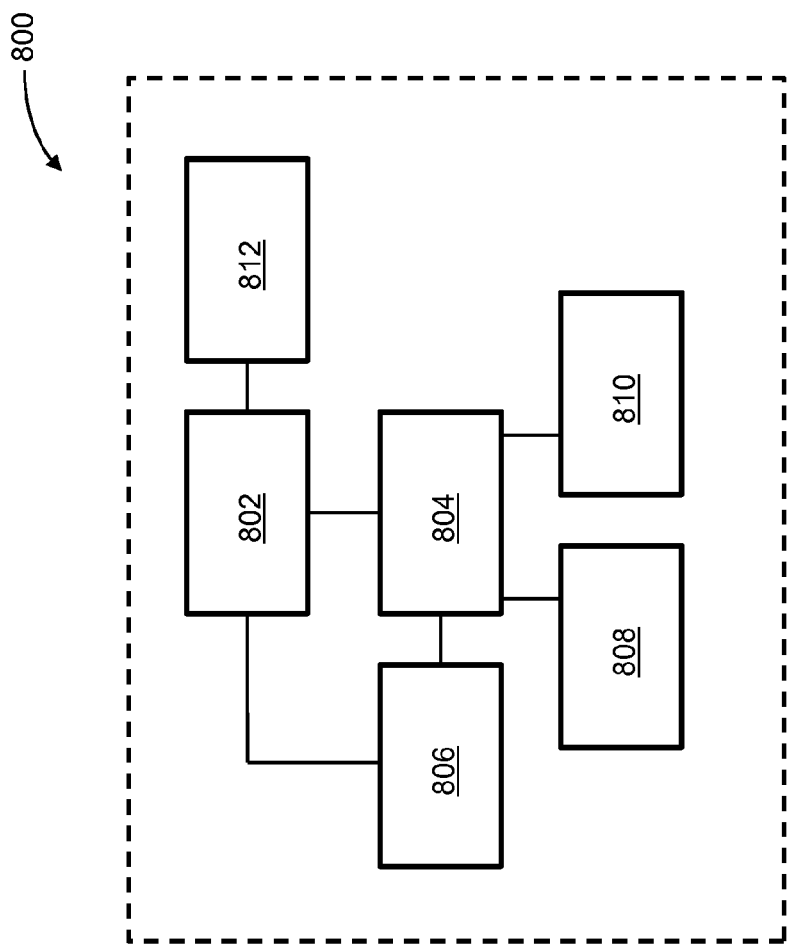
FIG. 8 is a schematic illustration by way of block diagram of a system for controlling a movable object, in accordance with embodiments.

FIG. 8 is a schematic illustration by way of block diagram of a system 800 for controlling a movable object, in accordance with embodiments. The system 800 can be used in combination with any suitable embodiment of the systems, devices, and methods disclosed herein. The system 800 can include a sensing module 802, processing unit 804, non-transitory computer readable medium 806, control module 808, and communication module 810.

The sensing module 802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 802 can be operatively coupled to a processing unit 804 having a plurality of processors. In some embodiments, the sensing module can be operatively coupled to a transmission module 812 (e.g., a Wi-Fi image transmission module) configured to directly transmit sensing data to a suitable external device or system. For example, the transmission module 812 can be used to transmit images captured by a camera of the sensing module 802 to a remote terminal.

The processing unit 804 can have one or more processors, such as a programmable processor (e.g., a central processing unit (CPU)). The processing unit 804 can be operatively coupled to a non-transitory computer readable medium 806. The non-transitory computer readable medium 806 can store logic, code, and/or program instructions executable by the processing unit 804 for performing one or more steps. The non-transitory computer readable medium can include one or more memory units (e.g., removable media or external storage such as an SD card or random access memory (RAM)). In some embodiments, data from the sensing module 802 can be directly conveyed to and stored within the memory units of the non-transitory computer readable medium 806. The memory units of the non-transitory computer readable medium 806 can store logic, code and/or program instructions executable by the processing unit 804 to perform any suitable embodiment of the methods described herein. For example, the processing unit 804 can be configured to execute instructions causing one or more processors of the processing unit 804 to analyze sensing data produced by the sensing module. The memory units can store sensing data from the sensing module to be processed by the processing unit 804. In some embodiments, the memory units of the non-transitory computer readable medium 806 can be used to store the processing results produced by the processing unit 804.

In some embodiments, the processing unit 804 can be operatively coupled to a control module 808 configured to control a state of the movable object. For example, the control module 808 can be configured to control the propulsion mechanisms of the movable object to adjust the spatial disposition, velocity, and/or acceleration of the movable object with respect to six degrees of freedom. Alternatively or in combination, the control module 808 can control one or more of a state of a carrier, payload, or sensing module.

The processing unit 804 can be operatively coupled to a communication module 810 configured to transmit and/or receive data from one or more external devices (e.g., a terminal, display device, or other remote controller). Any suitable means of communication can be used, such as wired communication or wireless communication. For example, the communication module 810 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 810 can transmit and/or receive one or more of sensing data from the sensing module 802, processing results produced by the processing unit 804, predetermined control data, user commands from a terminal or remote controller, and the like.

The components of the system 800 can be arranged in any suitable configuration. For example, one or more of the components of the system 800 can be located on the movable object, carrier, payload, terminal, sensing system, or an additional external device in communication with one or more of the above. Additionally, although FIG. 8 depicts a single processing unit 804 and a single non-transitory computer readable medium 806, one of skill in the art would appreciate that this is not intended to be limiting, and that the system 800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An impact protection apparatus for an unmanned aerial vehicle, the apparatus comprising:
    an inflatable member configured to be coupled to the unmanned aerial vehicle and inflatable to reduce forces experienced by the unmanned aerial vehicle during an impact;
        a container coupled to the inflatable member, said container comprising compressed gas;
        a control mechanism powered by a first power source separate from a second power source that provides power to the unmanned aerial vehicle, wherein the control mechanism is configured to cause the compressed gas to flow from the container into the inflatable member in response to a signal indicative of malfunction of the unmanned aerial vehicle; and
        a deactivatable safety mechanism that, unless deactivated, prevents inflation of the inflatable member, wherein the safety mechanism is deactivated by a safety signal indicating that the unmanned aerial vehicle is airborne.

2. The impact protection apparatus of claim 1 wherein the compressed gas is carbon dioxide.

3. The impact protection apparatus of claim 1 wherein a volume of the container is less than or equal to $0.001$ $m^3$.

4. The impact protection apparatus of claim 1 wherein a pressure of the compressed gas when in the container is greater than or equal to $0.2 \times 10^6$ Pa.

5. The impact protection apparatus of claim 1 wherein the control mechanism comprises a valve configured to control flow of the compressed gas into the inflatable member.

6. The impact protection apparatus of claim 1 wherein the control mechanism comprises an accelerometer configured to detect an acceleration of the unmanned aerial vehicle that is outside a predetermined range and is indicative of the malfunction.

7. The impact protection apparatus of claim 6 wherein the accelerometer is configured to detect an acceleration of the unmanned aerial vehicle indicative of the unmanned aerial vehicle being in a free fall condition.

8. The impact protection apparatus of claim 1 wherein the signal indicative of malfunction is generated from the unmanned aerial vehicle.

9. The impact protection apparatus of claim 1 wherein the signal indicative of malfunction is generated from an external device in communication with the unmanned aerial vehicle.

10. An unmanned aerial vehicle, the vehicle comprising:
    a vehicle body;
    the impact protection apparatus of claim 1 coupled to the vehicle body; and
    one or more propulsion units coupled to the vehicle body and configured to propel the vehicle body.

11. The aerial vehicle of claim 10, wherein the unmanned aerial vehicle is a rotorcraft.

12. A method for protecting an unmanned aerial vehicle from an impact, the method comprising:
    providing an inflatable member coupled to the unmanned aerial vehicle;
    receiving a safety signal indicating the unmanned aerial vehicle is airborne;
    deactivating, in response to the safety signal, a deactivatable safety mechanism that, unless deactivated, prevents inflation of the inflatable member;
    causing, in response to a signal indicative of malfunction of the unmanned aerial vehicle and by means of a control mechanism powered independently from the unmanned aerial vehicle, a compressed gas to flow into the inflatable member; and
    effecting inflation of the inflatable member by the flow of the compressed gas to reduce forces experienced by the unmanned aerial vehicle during the impact.

13. The method of claim 12 further comprising powering the control mechanism by a power source separate from that providing power to the one or more propulsion units of the unmanned aerial vehicle.

14. The method of claim 12 further comprising powering the control mechanism by a power source separate from that providing power to a flight control system of the unmanned aerial vehicle.

15. The method of claim 12 wherein the control mechanism comprises an accelerometer configured to detect an acceleration of the unmanned aerial vehicle that is outside a predetermined range and is indicative of the malfunction.

16. The method of claim 12 further comprising detecting, using a motion sensor from an inertial measurement unit, a loss of stability of the unmanned aerial vehicle that is indicative of the malfunction.

17. The method of claim 12 further comprising responding, with aid of the control mechanism, to a loss of power of the unmanned aerial vehicle that is indicative of the malfunction.

18. An impact protection apparatus for an unmanned aerial vehicle, the apparatus comprising:
 an inflatable member configured to be coupled to the unmanned aerial vehicle, wherein said inflatable member is inflatable to reduce forces experienced by the unmanned aerial vehicle during an impact;
 a container coupled to the inflatable member, said container comprising compressed gas;
 a control mechanism is configured to cause the compressed gas to flow from the container into the inflatable member, in response to a signal indicative of malfunction of said unmanned aerial vehicle; and
 a deactivatable safety mechanism that, unless deactivated, prevents inflation of the inflatable member, wherein the safety mechanism is deactivated by (1) an automated electronic signal provided by a flight control system of the unmanned aerial vehicle or (2) an electronic signal from a remote terminal configured to accept a user input.

19. The impact protection apparatus of claim 18 wherein the signal is indicative of malfunction of a member selected from the group consisting of one or more propulsion units of the aerial vehicle, a flight control system of the aerial vehicle, and a power source providing power to the aerial vehicle.

20. The impact protection apparatus of claim 18 wherein the safety mechanism comprises a pin and deactivation of the safety mechanism comprises removal of the pin.

21. The impact protection apparatus of claim 20 wherein the pin is configured to be removed by a user prior to operation of the unmanned aerial vehicle.

22. The impact protection apparatus of claim 18 wherein the safety mechanism is deactivated by a safety signal indicating that the unmanned aerial vehicle is in operation.

23. The impact protection apparatus of claim 22 wherein the safety signal is provided by a flight control system of the unmanned aerial vehicle.

24. An unmanned aerial vehicle, the vehicle comprising:
 a vehicle body;
 the impact protection apparatus of claim 18 coupled to the vehicle body; and
 one or more propulsion units coupled to the vehicle body and configured to propel the vehicle body.

25. A method for protecting an unmanned aerial vehicle from an impact, the method comprising:
 providing an inflatable member coupled to the unmanned aerial vehicle;
 receiving a safety signal from (1) a flight control system of the unmanned aerial vehicle or (2) a remote terminal configured to accept a user input;
 deactivating, in response to the safety signal, a deactivatable safety mechanism that, unless deactivated, prevents inflation of the inflatable member;
 causing, in response to a signal indicative of a malfunction of the aerial vehicle, a compressed gas to flow from said container into the inflatable member; and
 effecting inflation of the inflatable member by the flow of the compressed gas to reduce forces experienced by the unmanned aerial vehicle during the impact.

26. The method of claim 25 wherein the compressed gas is caused to flow using a valve.

27. The method of claim 26 further comprising powering the valve by a power source separate from that providing power to one or more propulsion units of the unmanned aerial vehicle.

28. The method of claim 26 further comprising powering the valve by a power source separate from that providing power to a flight control system of the aerial vehicle.

29. The method of claim 25 wherein the safety mechanism comprises a pin and deactivation of the safety mechanism comprises removal of the pin.

30. The method of claim 29 further comprising removing the pin by a user prior to operation of the unmanned aerial vehicle.

* * * * *